Feb. 26, 1946. G. A. BRACE 2,395,392
REFRIGERATION
Filed June 1, 1942 3 Sheets-Sheet 1

INVENTOR
George A. Brace
BY
Harry S. Demarrs
ATTORNEY

INVENTOR
George A. Brace
BY
Harry S. Dumars
ATTORNEY

Patented Feb. 26, 1946

2,395,392

UNITED STATES PATENT OFFICE 2,395,392

REFRIGERATION

George A. Brace, Washington, D. C., assignor to The Hoover Company, North Canton, Ohio, a corporation of Ohio Application June 1, 1942, Serial No. 445,263

25 Claims. (Cl. 62—119.5)

This invention relates to the art of refrigeration and more particularly to a refrigerating apparatus of the three-fluid absorption type particularly constructed and arranged to provide refrigerating effects at two distinct temperature levels for incorporation in a domestic refrigerating cabinet of the type characterized by the provision of distinct food preserving and low temperature refrigerating chambers.

It is a particular object of the invention to provide a cooling unit for the food preserving chamber which will produce a refrigerating effect at a high temperature level distributed over a large heat absorptive area, to provide a large refrigerating capacity for the preservation of foodstuffs and to construct the cooling unit so that it occupies a minimum of otherwise usable space in the storage chamber.

In the production of refrigeration for domestic use it is particularly desirable to provide low temperature refrigeration for the purpose of freezing ice, freezing desserts, storing frozen foods and the like. It is, however, also necessary to provide a refrigerating effect at a higher temperature level for the purpose of storing fresh foodstuffs. For the latter purpose refrigeration at a temperature level in the neighborhood of 40 or 45° F. is desirable.

In order to provide adequate high temperature refrigeration which will satisfactorily maintain the refrigerating load at the temperature level selected, it is desirable to provide a very large heat absorptive area for the refrigerating element but this is not permissible unless the apparatus is so constructed and arranged that the heat absorptive element occupies a minimum of otherwise usable space within the food storage chamber.

In applying these principles to three-fluid absorption refrigerating apparatuses of the type in which the refrigerating effect is produced by evaporation of a volatile refrigerant into an inert medium, it has been particularly difficult to obtain adequate heat absorptive area in the food storage chamber coupled with adequate capacity in the unit to sustain the load which it will be called upon to carry and at the same time to avoid objectionable consumption of otherwise usable space. A further major difficulty has arisen from the fact that the liquid refrigerant supplied to the food preserving evaporator tends to evaporate in toto into the inert gas and to drive the temperature level of that evaporator to a prohibitively low figure. If the evaporator is made small in size, a high temperature level may be maintained but the size of the evaporator precludes it from adequately sustaining the load which it is called upon to carry.

It is accordingly a principal object of the present invention to provide an absorption refrigerating apparatus of the three-fluid type which will overcome the above-mentioned difficulties and defects in prior machines.

It is a further object of the present invention to provide an absorption refrigerating apparatus of the three-fluid type characterized by the provision of a very long path of flow for the inert medium coupled with restricted contact between the gas and liquid at selected areas throughout the path of flow of the gas in order to provide a high temperature refrigerating effect which is spread over a large heat absorptive area without producing temperatures below that which it is desired to maintain in the food preserving portion of the apparatus. According to the present invention liquid refrigerant evaporates in limited amounts at a plurality of spaced points in an evaporator having a very large heat absorptive capacity. Consequently the temperature of the evaporator at any point does not drop appreciably below the desired temperature of the food storage space.

Other objects and advantages of the invention will become apparent as the description proceeds when taken in connection with the accompanying drawings, in which.

Figure 1:
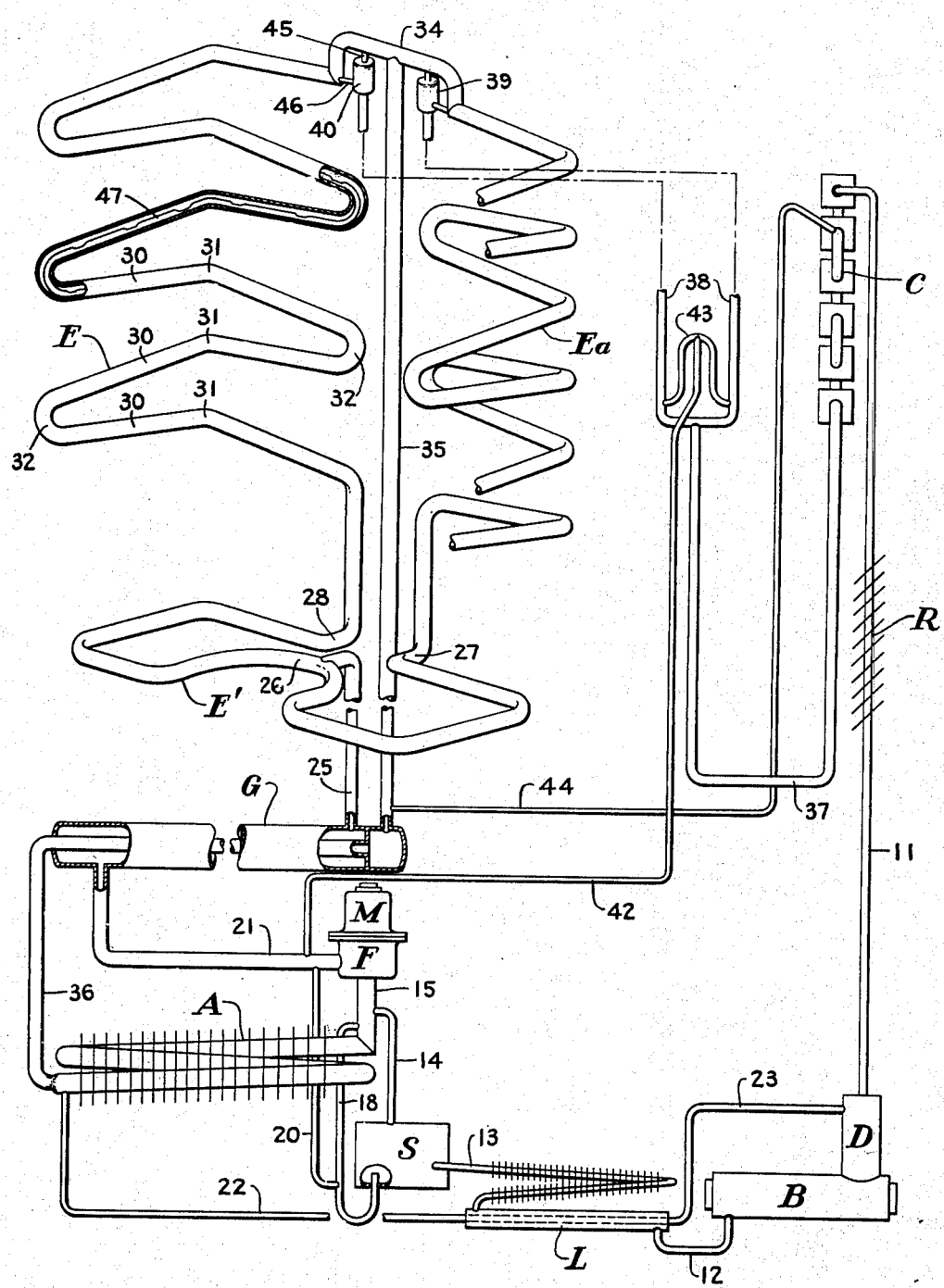
Figure 1 is a diagrammatic representation of one form of the invention shown partly in section.

Referring now to the drawings in detail and first to Figure 1 thereof, there is illustrated a refrigerating mechanism comprising a boiler B, an analyzer D, an air-cooled rectifier R, a tubular air-cooled condenser C, a pair of high temperature evaporating elements E and Ea, a low temperature evaporating element E', a gas heat exchange element G, a tubular air cooled absorber A, a solution reservoir S, a liquid heat exchange element L, a circulating pump element F which is driven by a suitable electrical motor M. The above described elements are suitably interconnected by various conduits to form a plurality of gas and liquid circuits to be described more fully hereinafter.

The refrigerating system above described will be charged with a suitable refrigerant, such as ammonia, a suitable solvent therefor, such as water, and an inert pressure equalizing medium, preferably a dense gas like nitrogen.

It will be understood that a suitable source of heat will be provided for heating the boiler B, such as a combustible fuel burner or an electrical cartridge heater.

The source of heat for the boiler B and the electrical motor M for the gas circulating element F may be controlled in any desired manner. A preferred control mechanism is illustrated and described in U. S. Letters Patent No. 2,228,343 issued January 14th, 1941.

The application of heat to the boiler B causes an evolution of vapor from the solution of the refrigerant in the absorbent therein contained. The vapor so produced passes upwardly through the analyzer D in contact with and in counter-flow relationship with strong solution flowing downwardly through the analyzer. The vapor is conducted from the upper end of the analyzer to the upper end of the air-cooled condenser C by means of the conduit 11 which includes the air-cooled rectifying element R.

The weak solution formed in the boiler B by the evolution of refrigerant vapor is conducted therefrom to the reservoir S by way of the conduit 12, the liquid heat exchanger L, and the finned looped conduit 13 which forms a solution pre-cooler.

The upper gas containing space of the reservoir S is vented by means of the conduit 14 to the suction conduit 15 of the gas circulating element F.

The conduit 15 connects to the upper end of the absorber A as illustrated. The solution in the reservoir S is conveyed into the conduit 15 adjacent its point of connection with the absorber A by means of the gas lift pump conduit 18 which is supplied with pumping gas by the conduit 20 which receives gas from the discharge conduit 21 of the gas circulator F.

The lean solution supplied to the conduit 15 flows therefrom into the absorber A and then flows downwardly through the absorber A by gravity. In its passage through the absorber A the solution is brought into contact with a mixture of pressure equalizing medium and refrigerant vapor which is supplied to the absorber in a manner to be described hereinafter. The solution absorbs refrigerant vapor from the inert gas refrigerant vapor mixture and the resulting heat of absorption is rejected to cooling air by the fins provided on the exterior wall of the absorber conduit.

The enriched solution formed in the absorber flows to the bottom portion thereof from which point it is conveyed to the upper portion of the analyzer D by way of the conduit 22, the liquid heat exchanger L, and the conduit 23, thus completing the absorption solution circuit.

The inert gas which leaves the absorber through the conduit 16 has a very low refrigerant vapor content and is designated as lean gas. This gas flows into the circulating element F where its pressure is raised and it is then discharged through the conduit 21 into the outer path of the gas heat exchanger G from which point it is conveyed through the conduit 25 to the evaporator E'.

The evaporator E' consists of a tubular conduit element lying in a horizontal plane and shaped to form a rectangular body provided in its mid-portion with an inwardly extending bight or U-shaped portion indicated at 26.

The element E' is not a closed rectangle but terminates in two adjacent end conduits 27 and 28 which join the lower end of the evaporating element Ea and E, respectively.

The evaporating elements E and Ea are identical; therefore, only one will be described.

The evaporator E comprises a series of conduit elements 30, each of which is right angularly bent at its mid-portion as indicated at 31. The conduits 30 are serially connected at their end portions by return bends 32 and adjacent conduits 30 are sloped downwardly in opposite directions. Consequently, the evaporator E comprises a right angularly bent conduit frame extending vertically and providing a continuously downwardly sloped conduit. The evaporator E has been described as if the same were made of a plurality of separate conduit sections and elements welded or secured together in some other manner. This is one possible method of construction. However, the evaporator E may be made of a single continuous conduit bent to a suitable shape as illustrated.

The evaporators E and Ea at their upper ends terminate in an inverted U-shaped conduit element 34 to which they are connected. Thus, the evaporating portion of the apparatus as a whole may be said to comprise two sections or parts, one of which comprises the evaporator E and the left hand end of the evaporator E', as viewed in Figure 1, and the other evaporator section or portion comprises the evaporator Ea and the right hand portion of the evaporator E', as viewed in Figure 1.

The inert gas supplied to the mid-portion of the bight conduit 26 through the gas conduit 25 divides into two streams, one of which flows through the left hand end portion of evaporator E', conduit 28 and evaporator E to the conduit 34 and the other of which flows through the right hand portion of evaporator E', conduit 27 and evaporator Ea to the conduit 34. The two segments or parts of the gas stream unite in the mid portion of conduit 34 and are conveyed therefrom to the bottom portion of the absorber A by means of the conduit 35, the inner path of the gas heat exchanger G and the conduit 36. The rich inert gas which has traversed the evaporator and is conveyed to the lower portion of the absorber then flows upwardly through the absorber in counter-flow relationship with and in contact with the absorption solution as heretofore described.

The condensate formed in the condenser C drains to the bottom thereof and then into a deep U-tube 37 which terminates in the bight portion of a U-shaped twin gas lift pump mechanism 38. The legs of the twin gas lift pump 38 terminate in gas and liquid separation vessels 39 and 40. Pumping gas is supplied to the lower ends of the legs of the twin gas lift pump 38 from the gas discharge conduit 21 of the gas circulating element F by the conduit 42 and an inverted U-shaped conduit 43. A detailed description of the functioning and method of operation of a twin gas lift pump will be found in U. S. Letters Patent No. 2,240,176, issued April 29, 1941. It is characteristic of a twin gas lift pump that the liquid supplied to the bight portion thereof is substantially equally divided between the legs and is elevated by gas lift action through the legs of the pump. Consequently, the liquid formed in the condenser is divided into substantially equal bodies and the divided bodies of liquid are elevated into the gas and liquid separation chambers 39 and 40. The gas pump may be and preferably is covered with heat insulating material (not shown) to avoid excessive refrigeration in the pump and the collection of frost thereon. However, sufficient refrigeration does take place to pre-cool the refrigerant, thereby avoiding the heating of the upper part of the cabinet.

The condenser C is provided with a purge conduit 44 which connects between the condenser and the rich gas return conduit 35 in order to relieve the condenser of non-condensible products such as inert gas.

Figure 3:
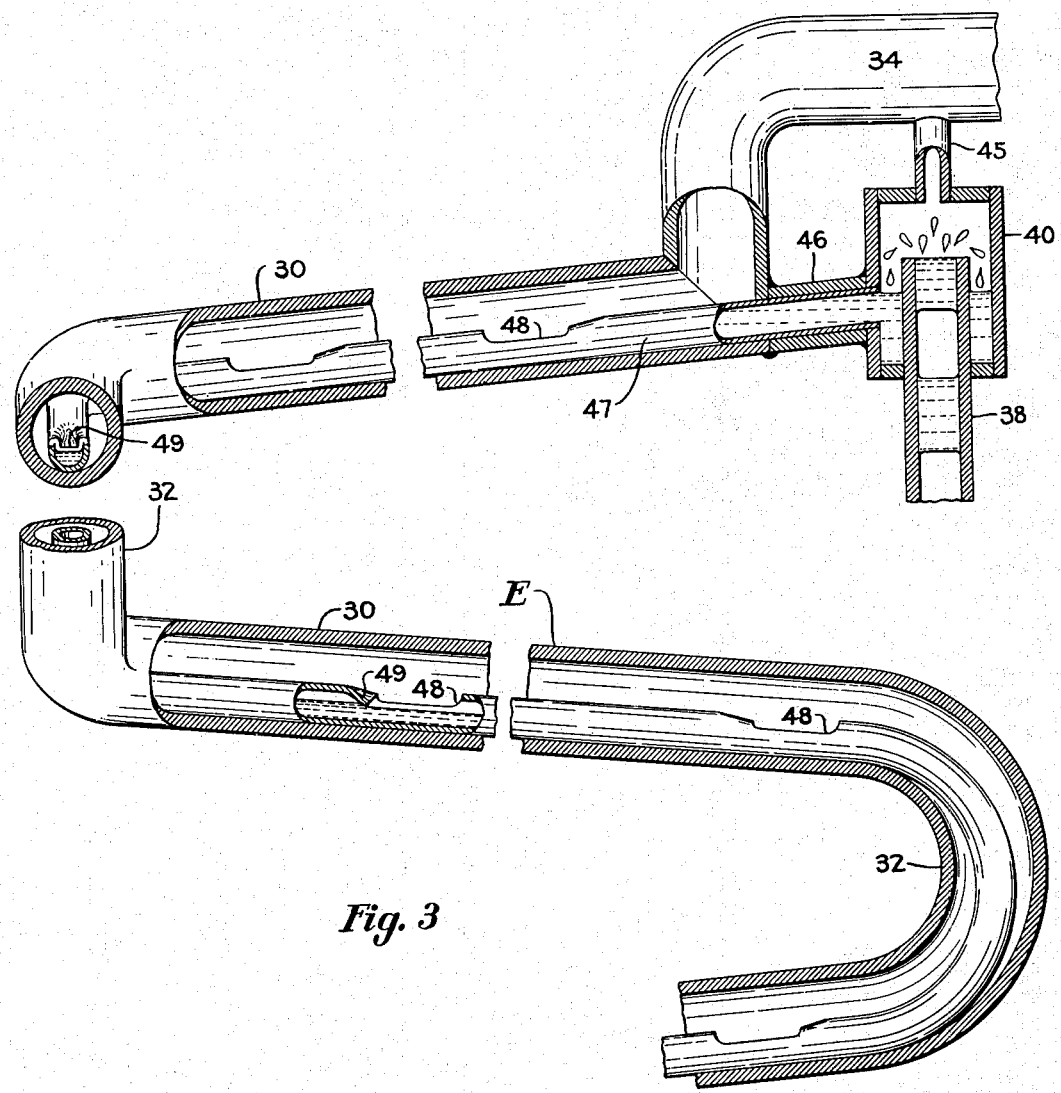
Figure 3 is a sectional detail drawn on an enlarged scale of an evaporator.

Referring now to Figure 3 there is illustrated an enlarged sectional view of the evaporator E. The leg 38 of the gas lift pump discharges the gas and liquid into the chamber 40 in which the liquid falls to the bottom of the chamber and the gas passes off from the top of the chamber 40 to the rich gas conduit 34 through the conduit 45. If desired, or when it is necessary to elevate the refrigerant a considerable distance above the bottom of the condenser, conduits 45 may join and reenter the inert gas circuit at a point of lower pressure as at conduit 15.

The chamber 40 is connected to the upper end of evaporator E by a conduit or sleeve element 46 which is of sufficient weight to withstand the pressures normally encountered in systems of the type here under consideration. Throughout the evaporator E there extends a small light weight sheet metal conduit 47 resting upon the bottom wall of the conduit 30. The conduit 47 extends through the sleeve 46 into the interior of the chamber 40 in order to receive the liquid refrigerant supplied to the chamber 40. At spaced intervals along its upper face segments are cut out of the body of the conduit 47 as is indicated at 48. One edge—or both edges—of each segment 48 is provided with a downwardly struck lip 49 which extends inwardly of conduit 47 a sufficient distance to dip into the liquid refrigerant flowing through the conduit 47 so as to form a gas seal and thus prevent the inert gas from flowing through the conduit 47.

Due to the construction of the conduit 47 the liquid refrigerant flowing therethrough is exposed to the inert gas in small amounts at spaced points along the length of the evaporator E so that the quantity of refrigeration which can be produced in the evaporator E is restricted to the amount which can be produced in a length of conduit equal to the aggregate of the lengths of the cut-outs 48 and with the gas and liquid contact area equal to the aggregate of the projected areas of the cut-outs 48. This construction spreads the refrigerating effect over a very long path.

The refrigeration produced at any point is limited by the refrigerant surface in contact with inert gas. By suitably varying the exposed refrigerant surface area and the distance between exposed areas, it will be readily apparent that a simple and highly effective method is provided for obtaining any desired refrigerating effect.

The refrigeration produced in the evaporator E makes itself effective in the conduit 30 thereof through the cold gas formed at the cut-outs and also through the conduction of heat from the outer conduit 30 to the inner conduit 47 and thus to the liquid refrigerant which is periodically cooled at the various cut-out portions. The lips 49 may be struck to progressively greater depths along the length of the conduit 47 in order to insure that the liquid will always be contacted with the lips even after a portion of the liquid has evaporated.

In the operation of this device excessively low temperatures never become effective on the exterior of the conduit 30 because the path of heat flow is principally to the gas and secondarily to the liquid and also because of the fact that the refrigerating effect is provided at spaced points whereby there is a flow of heat lengthwise of the conduit 30 from the portion midway between adjacent cut-outs 48 to the areas immediately adjacent the cut-out portions of the conduit 47. In this way a large amount of liquid may be circulated through the evaporators E and E' with the assurance that an appreciable quantity of usable liquid will be discharged from the bottom thereof, that the refrigerating effect will be substantially uniformly spread throughout the very long path of flow of the gas and liquid and that there will be no effective production of refrigeration at temperatures low enough to promote dehydration of foodstuffs and formation of frost on the cooling unit.

The liquid refrigerant which traverses the evaporators E and Ea then discharges into the right and left halves of the evaporator E' where it flows in counterflow relationship and in contact with the lean inert gas which is supplied to the evaporator E' through the conduit 25 as a consequence of which the refrigerating effect which occurs in the evaporator E' is produced at a low temperature level suitable for the freezing of ice, preservation of frozen foods and production of frozen desserts and the like.

Figure 2:
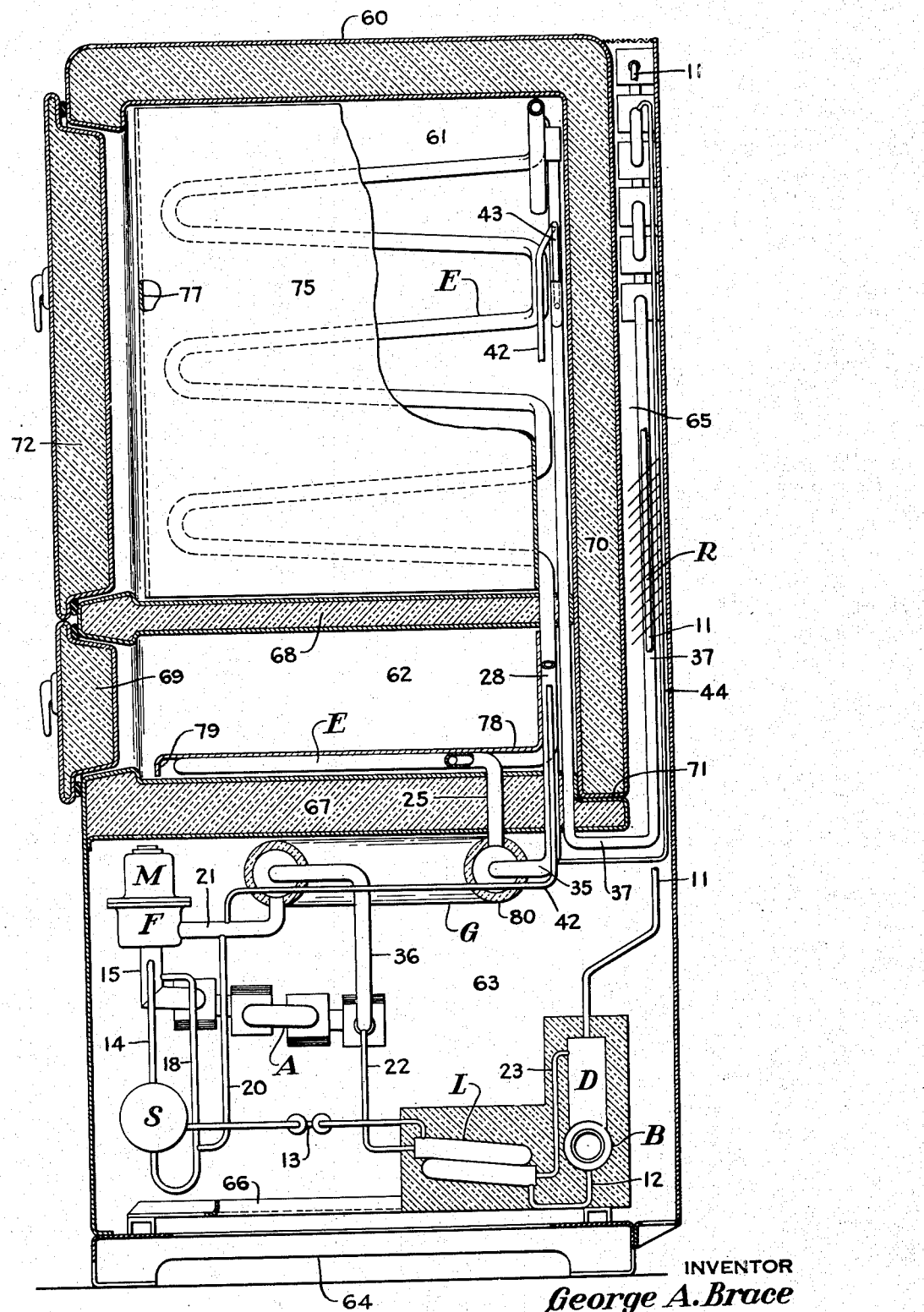
Figure 2 is a side elevational view partly in section illustrating the form of the invention of Figure 1 associated with a cabinet structure.

Referring now to Figure 2, there is provided an insulated cabinet structure 60 provided with a high temperature food storage compartment 61 and a low temperature freezing compartment 62. A mechanism chamber 63 underlies the freezing and food preserving compartment and rests upon an open foot or base structure 64 which rests upon the floor and is open to allow free access of cooling air to the compartment 63 and to the rear air flue 65.

The arrangement of the various parts of the refrigerating mechanism together with interconnecting conduits is obvious from an inspection of Figure 2. The boiler, analyzer, liquid heat exchanger assembly, absorber, gas heat exchanger, motor circulator unit and their connecting conduits are all positioned in the chamber 63 and are secured to a suitable angle iron frame, the base portion of which is indicated at 66 and is secured to the foot element 64.

The cabinet structure is formed in two parts, the first or base part of the cabinet structure comprises the element 64, the frame 66, the lower insulated wall 67 of the chamber 62, the lateral side walls on the chamber 62 and the top wall 68 of the chamber 62 together with the insulated door 69 of chamber 62.

As is readily apparent from Figure 2 the various evaporating units extend upwardly above the chamber 63 and the condenser, rectifier and their associated conduits extend upwardly from the chamber 63 into the flue 65. No frame structure is provided other than that inherently provided by the lower portion of the cabinet, the sub-frame in the compartment 63 and the inherent rigidity and high mechanical strength of the various parts of the refrigerating system. The refrigerating system must be constructed to withstand high internal pressures, as a consequence of which the parts thereof possess great mechanical strength which is sufficient to hold the evaporator, condenser, rectifier and their associated conduits in proper position without aid from other structural elements.

As shown in Figure 2 all portions of the apparatus which are positioned above the level of the partition or wall 67 are interconnected by vertically extending conduits which extend either through the partition 67 or upwardly in the rear portion thereof so that no parts of the refrigerating mechanism extends into or through any vertically extending wall of the cabinet structure. The various gas and liquid connections for the evaporators extend vertically along the rear wall of the cabinet structure through the chamber 67. In the case of the condenser connection to the gas lift pump the conduit 37 drops downwardly from the lower portion of the condenser to a level beneath the insulated wall 67, then makes a U turn and extends upwardly through the rear portion of the wall 67 adjacent the rear wall of the cabinet.

The upper portion of the cabinet structure is simply lowered over the assembled lower part thereof and the associated refrigerating mechanism after that has been assembled and tested. The rear wall 70 of the cabinet structure 60 extends downwardly and forms the rear closure of the chamber 62 engaging with a rear stepped portion 71 of the wall 67. The wall 70 also engages the lateral side walls of the chamber 62 and rests upon the lateral edges of the wall 68 in a step (not shown) similar to that illustrated at 71. The insulated closure element 72 of the chamber 61 is carried by the upper portion of the cabinet 60. After the upper portion of the cabinet 60 has been assembled with the lower part thereof the joints may be sealed by a gasket, sealing compound and the like and draw bolts or similar known means may be provided to secure the two portions of the cabinet in assembled relation.

Alternately the entire upper portion of the cabinet may simply rest upon and be secured to the lower wall 67. In this construction the dividing partition 68 will be constructed of plate glass or transparent plastic to permit a view of the contents of the sharp freezing chamber and will be removably supported by the side walls of the cabinet structure.

The evaporators E and Ea extend along the lateral and rear vertical walls of the chamber 61; that is, each of the evaporators E and Ea has a portion extending along one side wall and along a part of the rear wall of the chamber 61. The conduits forming the evaporators E and Ea are suitably secured to a U-shaped sheet metal plate 75 which is substantially co-extensive with the lateral side and rear walls of the chamber 61 and serves to connect the evaporators E and Ea. The front edges of the U-shaped plates 75 are provided with outwardly turned lips, as is indicated at 77, to conceal the front edges of the evaporator conduits E and Ea from view. The plates 75 are suitably secured to the evaporators E and Ea and will be provided with means for supporting the usual shelves. The various evaporator conduits and their connecting gas and liquid conduits have sufficient inherent mechanical strength to support the food supplying shelves and the partition 75. The partition 75 may rest upon the upper surface of the insulated partition 68 to provide additional support.

The evaporator E' lies along the lower wall of the chamber 62 and is suitably secured to an L-shaped heat conducting plate 78 which hides the evaporator conduit E' and also the vertically extending conduit in the rear portion of the chamber 62. The front portion of the plate 78 is provided with a downturned lip 79 to conceal the front portion of the evaporator E' from view.

The gas heat exchanger is positioned directly beneath the insulated partition 67 and provided with a sheet of insulating material as is indicated at 80.

By reason of the above-described cabinet structure the evaporators occupy a minimum of otherwise usable space within the refrigerating chambers. They are all positioned closely adjacent a wall of the various refrigerating chambers, thereby leaving substantially the entire space within the chamber free to accommodate materials to be refrigerated. The U-shaped plate 75 which is positioned in the chamber 61 provides a very extensive heat transfer area within that chamber whereby all portions of the chamber may be maintained at substantially the same temperature level and a relatively high temperature may be carried in that chamber even at very high refrigerating load without necessitating low temperature operation of any portion of the cooling unit provided for that chamber. This is made possible by the very extensive heat absorbing area provided in the chambers 61 coupled with the evaporator construction which prevents the occurrence of low temperatures at any point and spreads the refrigerating effect over an extremely large heat absorbing area.

A further factor tending to maintain the desired temperature differential between the parts of the apparatus is occasioned by the fact that the inert gas travels first through the low temperature evaporator E' as a result of which the inert gas supplied to the evaporators E and Ea is partially saturated and does not thereby tend to cause evaporation of the refrigerant in the extremely low temperature region. This latter effect, however, is not always operative as under many operating conditions all material in the chamber 62 will be solidly frozen and at a low temperature, as a result of which there will be only the very small heat leakage load to be carried by the evaporator in that compartment. Even under these conditions, however, the spaced contact between the gas and liquid which is provided by the structure of the evaporators E and Ea prevents the attainment of undesirably low temperatures, temperatures such as would cause undue dehydration of foodstuffs and/or collection of frost on the plate 75, within the chamber 61.

Figure 4:
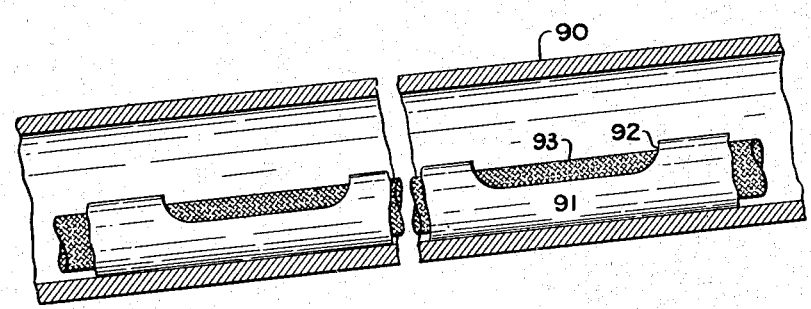
Figure 4 is an enlarged scale detail view of a modified form of an evaporator.

Referring now to Figure 4 there is disclosed a slightly modified form of the evaporator structure. This evaporator structure is intended to replace or to be used as an alternate to the inner construction of the conduit 47 of the evaporators E and Ea described above.

Only a section of the evaporator of Figure 4 is illustrated as it will be understood that this evaporator is designed and intended to have the same external configuration as the evaporators E and Ea and to be utilized in exactly the same manner.

In the evaporator of Figure 4 there is provided an outer conduit 90 through which the inert gas circulates. A small diameter light weight sheet metal conduit 91 is also provided and includes a plurality of spaced cut-out portions 92. The interior of the conduit 91 is provided with a fine mesh wicking material 93 which contacts the liquid refrigerant. The wicking saturates itself with liquid refrigerant and prevents passage of inert gas therethrough into the conduit 91. In this construction the inert gas is allowed to contact liquid refrigerant in the wicking 93 only at the cut-out portions 92 of conduit 91 and produces the spaced refrigerating effect characteristic of the evaporator structure described above in connection with Figures 1 to 3.

In the present construction the inert gas and the liquid refrigerant flow in a common conduit so constructed that the portion of the free surface area of liquid refrigerant in the conduit which is exposed to and in contact with the inert gas is substantially less than the total free surface area of liquid refrigerant in the common passageway or conduit. In this way it is feasible to provide extremely long evaporator conduits with limited areas of contact between the inert gas and the free surface of the liquid refrigerant, so distributed as to distribute the refrigerating effect throughout the length of the long conduit without producing external temperatures sufficient to cause deposition of frost. As used herein, the term "free surface area," means any surface of liquid, however formed, which is capable of forming a surface of evaporation or disengagement from which the refrigerant can disengage from its liquid phase as distinguished from a surface which is in contact with an impermeable wall such as the wall of a retaining pipe or the like.

It is also within the scope of my invention to pass the liquid refrigerant into a gas conduit of an evaporator within a small inner conduit which is provided at spaced points with very fine openings which allow small amounts of liquid to seep into the outer gas conduit at spaced points along the length thereof. This structure also will produce the spaced refrigerating effect characteristic of the evaporators described above in connection with Figures 1 to 3.

The invention has been illustrated and described in connection with a particular refrigerating system but it is to be understood that it is applicable to other absorption refrigerating systems using other gases and other modes of gas and liquid circulation.

While I have illustrated and described my invention in considerable detail, it is to be understood that the invention is not to be limited thereto but that changes and variations may be made without departing from the spirit thereof or the scope of the appended claims.

I claim:

1. In a refrigerator; a cabinet structure comprising an insulated food storage chamber and an insulated freezing chamber, an air cooled refrigerating apparatus of the three-fluid absorption type operatively associated with said cabinet structure including an evaporator in each of said chambers, means for conducting an inert gas to and from said evaporators, means for producing refrigerant liquid and for supplying the same to said evaporators, one of said evaporators being characterized by the provision of an elongated passageway throughout which the inert gas and refrigerant liquid flow, and means in said passageway for restricting the contact between the gas and liquid in said passageway to a plurality of segregated areas having a combined length less than the length of said passageway.

2. In a refrigerator; a cabinet structure comprising an insulated food storage chamber and an insulated freezing chamber; an air cooled refrigerating apparatus of the three-fluid absorption type operatively associated with said cabinet structure including an evaporator in each of said chambers, means serially connecting said evaporators for flow of inert gas and refrigerant liquid, means for conducting inert gas to said evaporator in said freezing chamber and for removing inert gas from said evaporator in said food preserving chamber, means for supplying refrigerant liquid to said evaporator in said food preserving chamber, and means in said evaporator in said food preserving chamber for causing the refrigerant liquid and inert gas to flow through said evaporator out of contact with each other at spaced parts of said evaporator.

3. In a refrigerating apparatus of the absorption type a generator and an absorber connected for circulation of absorption solution therebetween, a plurality of evaporators, means connecting said evaporators in parallel with each other and in series with said absorber for circulation of inert gas therebetween, means for liquefying refrigerant vapor produced in said generator, means for supplying portions of the liquefied refrigerant to each of said evaporators, and means providing for limited areas of contact between the inert gas and refrigerant liquid flowing through said evaporators to limit the refrigerating effect produced in a selected portion of each of said evaporators.

4. In a three-fluid absorption refrigerating apparatus an elongated evaporator conduit, means for conveying an inert medium to one portion of said conduit and for conveying the inert medium away from another portion of said conduit, means for producing refrigerant liquid, and a refrigerant liquid conduit in said evaporator conduit arranged to receive refrigerant liquid from said liquid refrigerant producing means, said refrigerant conduit being constructed and arranged to provide sections along the length thereof wherein the inert medium and refrigerant liquid flow in contact separated by sections through which the inert medium and refrigerant liquid flow out of contact along the length of said evaporator conduit.

5. In a three-fluid absorption refrigerating apparatus an elongated evaporator conduit, means for conveying an inert medium to one portion of said conduit and for conveying the inert medium away from another portion of said conduit, means for producing refrigerant liquid, and a refrigerant liquid conduit in said evaporator conduit arranged to receive refrigerant liquid from said liquid refrigerant producing means, said refrigerant conduit being provided with a plurality of spaced cut-out portions in the upper wall thereof and baffles in said refrigerant liquid conduit arranged to prevent flow of inert medium therethrough.

6. In a three-fluid absorption refrigerating apparatus an elongated evaporator conduit, means for conveying an inert medium to one portion of said conduit and for conveying the inert medium away from another portion of said conduit, means for producing refrigerant liquid, and a refrigerant liquid conduit in said evaporator conduit arranged to receive refrigerant liquid from said liquid refrigerant producing means, said refrigerant conduit being provided with a plurality of spaced openings in the wall thereof, and capillary means in said conduit extending over said openings.

7. In a refrigerator, a cabinet structure including an insulated refrigerating chamber, an absorption refrigerating apparatus associated with said cabinet structure comprising a generator and an absorber connected for circulation of absorption solution therebetween, a pair of evaporators in said chamber arranged for parallel flow of inert gas therethrough and serially connected to said absorber for circulation of inert gas therebetween, each of said evaporators comprising an elongated sinuous conduit fitted closely to the interior walls of said refrigerating chamber, a condenser connected to receive refrigerant vapor from said generator, a twin gas lift pump arranged to receive refrigerant liquid from said condenser and to discharge substantially equal quantities of liquid refrigerant into each of said conduits, and a U-shaped panel mounted in said chamber in position to conceal said conduits and thermally bonded thereto.

8. In a refrigerator, a cabinet structure including an insulated refrigerating chamber, an absorption refrigerating apparatus associated with said cabinet structure comprising a generator and an absorber connected for circulation of absorption solution therebetween, a pair of evaporators in said chamber arranged for parallel flow of inert gas and serially connected to said absorber for circulation of inert gas therebetween, each of said evaporators comprising an elongated sinuous conduit fitted closely to the interior walls of said refrigerating chamber, means for condensing refrigerant vapor produced in said generator and for supplying condensate to each of said conduits, and means forming inner side and rear walls in said chamber positioned to conceal and in heat transfer relationship with said conduits whereby said chamber is directly cooled by a cold body having a heat absorbing surface substantially coextensive with a plurality of the walls thereof.

9. In a refrigerator a cabinet structure including an insulated refrigerating chamber, an absorption refrigerating apparatus associated with said cabinet structure including an elongated evaporator conduit arranged to lie along and refrigerate substantially the entire area of a plurality of the walls of said refrigerating chamber, an absorber connected to said evaporator conduit for circulation of inert gas therebetween, a generator connected to said absorber for circulation of absorption solution therebetween, a condenser arranged to receive refrigerant vapor from said boiler and to supply refrigerant liquid to said evaporator conduit, and means associated with said evaporator conduit for restricting the inert gas and refrigerant liquid contact area throughout the length of said conduit to an amount sufficient to maintain temperature conditions in said chamber above the freezing point of water to foster high humidity conditions therein.

10. In a refrigerator a cabinet structure including an insulated refrigerating chamber, an absorption refrigerating apparatus associated with said cabinet structure including a plurality of elongated evaporator conduits connected in parallel arranged to lie along and refrigerate substantially the entire area of a plurality of the walls of said refrigerating chamber, an absorber connected to said evaporator conduits for circulation of inert gas therebetween, a generator connected to said absorber for circulation of absorption solution therebetween, a condenser arranged to receive refrigerant vapor from said boiler and to supply refrigerant liquid to said evaporator conduits, and means associated with said evaporator conduits for restricting the inert gas and refrigerant liquid contact areas throughout the length of said conduits to amounts sufficient to maintain temperature conditions in said chamber above the freezing point of water to foster high humidity conditions therein.

11. In a refrigerator a cabinet structure including an insulated freezing chamber and an insulated food storage chamber overlying said freezing chamber, a mechanism compartment underlying and extending vertically along one wall of said insulated chambers, an absorption refrigerating apparatus associated with said cabinet structure including a pair of parallel connected sinuous evaporator conduits extending over and arranged to refrigerate substantially the entire area of a plurality of the walls of said food storage chamber, an evaporator conduit serially connected to said first mentioned evaporator conduits lying adjacent the lower wall of said freezing chamber, an air cooled absorber in said mechanism compartment underlying said freezing chamber, means extending vertically through the lower walls of said chambers adjacent a vertical wall thereof providing for circulation of inert gas between said absorber and said evaporator conduits, a generator in said mechanism compartment, means providing for circulation of inert gas between said generator and said absorber, an air cooled condenser in the vertically extending portion of said mechanism compartment connected to receive refrigerant vapor from said generator, and means for conveying refrigerant liquid from said condenser to said evaporator conduits in said food storage chamber, said last mentioned means extending vertically through the lower walls of said chambers adjacent a vertical side wall thereof.

12. In a refrigerator a cabinet structure including an insulated freezing chamber and an insulated food storage chamber overlying said freezing chamber, a mechanism compartment underlying and extending vertically along one wall of said insulated chambers, an absorption refrigerating apparatus associated with said cabinet structure including a pair of parallel connected sinuous evaporator conduits extending over and arranged to refrigerate substantially the entire area of a plurality of the walls of said food storage chamber, an inner heat conducting panel structure in said food storage chamber overlying and concealing said evaporator conduits and refrigerated thereby, an evaporator conduit serially connected to said first mentioned evaporator conduits lying adjacent the lower wall of said freezing chamber, an air cooled absorber in said mechanism compartment underlying said freezing chamber, means extending vertically through the lower walls of said chambers adjacent a vertical wall thereof providing for circulation of inert gas between said absorber and said evaporator conduits, a generator in said mechanism compartment, means providing for circulation of inert gas between said generator and said absorber, an air cooled condenser in the vertically extending portion of said mechanism compartment connected to receive refrigerant vapor from said generator, and means for conveying refrigerant liquid from said condenser to said evaporator conduits in said food storage chamber, said last mentioned means extending vertically through the lower walls of said chambers adjacent a vertical side wall thereof, said refrigerating apparatus and said inner panel forming a rigid self-supporting assembly.

13. That improvement in the art of absorption refrigeration employing a refrigerant, an absorbent for the refrigerant and a pressure equalizing medium which is inert with respect to the refrigerant and the absorbent which includes the steps of applying heat to a solution of refrigerant in the absorbent to liberate refrigerant vapor, converting the said vapor to the liquid state, passing the liquid and the pressure equalizing medium through an elongated path of flow in heat transfer relation with a medium to be cooled, and limiting the contact between the pressure equalizing medium and the liquid refrigerant throughout said path of flow to an amount just sufficient to provide for the evaporation of the liquid at a rate to produce a refrigerating effect insufficient to freeze water.

14. That improvement in the art of absorption refrigeration employing a refrigerant, an absorber for the refrigerant and a pressure equalizing medium which is inert with respect to the refrigerant and the absorbent which includes the steps of applying heat to a solution of refrigerant in the absorbent to liberate refrigerant vapor, converting the said vapor to the liquid state, passing the liquid and the pressure equalizing medium through an elongated path of flow in heat transfer with a medium to be cooled, limiting the contact between the pressure equalizing medium and the liquid refrigerant throughout said path of flow to an amount just sufficient to provide for the evaporation of the liquid at a rate to produce a refrigerating effect insufficient to freeze water, and passing refrigerant liquid which has traversed said path of flow in contact with pressure equalizing medium flowing to said path of flow to produce a low temperature refrigerating effect.

15. An evaporator adapted for use in an absorption refrigeration apparatus comprising means for conducting a stream of inert gas from an inlet connection to an outlet connection, and means for conducting liquid refrigerant in a path contiguous to said stream of inert gas, said last named means being constructed and arranged to provide contact between the inert gas and a plurality of spaced areas of the free surface area of refrigerant liquid in said conducting means whereby vaporization of refrigerant takes place at said areas of contact.

16. An evaporator adapted for use in an absorption refrigeration apparatus comprising a conduit for conducting a stream of inert gas therealong, means associated with said conduit for conducting liquid refrigerant along a path contiguous to but separated from said stream of inert gas throughout a major portion thereof, and means providing contact distributed along the length of said conduit between said inert gas and a portion of the free surface area of the refrigerant liquid whereby the evaporation of said refrigerant stream takes place over an extended path of flow.

17. An absorption refrigeration apparatus including an evaporator having an upper high temperature section and a lower sharp freezing section, means for supplying refrigerant to the evaporator, means for absorbing refrigerant vapor derived from said evaporator, a cabinet for said apparatus having an upper high temperature compartment and a lower sharp freezing compartment into which said upper and lower evaporator sections respectively fit, said upper evaporator section extending throughout a major portion of said high temperature compartment, and means in said upper evaporator section for conveying refrigerant liquid through a part of said upper evaporator section out of contact with the inert gas.

18. A refrigerator having a relatively large high temperature compartment and a relatively small sharp freezing compartment, an absorption refrigeration apparatus associated with said refrigerator and including evaporator means located partially in each of said compartments, said evaporator means in said high temperature compartment comprising conduit means extending over the greater portion of one or more walls of said compartment and means in said conduit means constructed and arranged to restrict the contact between the inert gas and refrigerant sufficient to limit evaporation of refrigerant throughout substantially the whole length thereof to a small portion of the total quantity of liquid in said conduit, whereby to prevent the formation of frost thereon.

19. In a refrigerating apparatus an insulated cabinet structure having an insulated food storage compartment and a liner for said food storage compartment, a refrigerating apparatus associated with said cabinet including a cooling element constructed and arranged to refrigerate said compartment at food preserving temperature and high humidity, said cooling element being positioned within said compartment along a plurality of the walls of said liner, a heat transfer plate for supporting food supporting shelves thermally bonded to said cooling element and forming an inner liner for said compartment concealing said cooling element.

20. In a refrigerating apparatus an insulated cabinet structure having an insulated food storage compartment, a refrigerating apparatus associated with said cabinet including an elongated cooling conduit positioned within said compartment along a wall thereof, means for supplying refrigerant liquid and inert gas to said conduit, means for restricting the area of contact between the inert gas and refrigerant liquid flowing through said conduit along the length thereof to an amount less than the free surface area of said refrigerant liquid in said cooling conduit whereby to produce refrigeration above frost forming temperatures and a liner plate thermally bonded to said conduit to conceal said conduit and to conduct heat from said compartment to said conduit.

21. In a refrigerating apparatus an evaporator forming an elongated passageway, means for introducing refrigerant liquid into one end of said passageway and for withdrawing unused refrigerant liquid from the other end of said passageway, means for supplying an inert gaseous medium to said passageway and means within said passageway for holding said inert medium and refrigerant liquid out of contact with each other within said passageway at spaced points as said refrigerant liquid and inert medium flow through said passageway.

22. In a refrigerating apparatus an evaporator forming an elongated passageway, means for introducing refrigerant liquid into one end of said passageway and for withdrawing unused refrigerant liquid from the other end of said passageway, means for supplying an inert gaseous medium to said passageway, and means within said passageway for restricting the area of contact between the refrigerant and gaseous medium in said passageway to an area less than the free surface area of the liquid flowing through said passageway.

23. Absorption refrigerating apparatus of the three-fluid type utilizing a refrigerant, an absorbent and a gaseous medium which is inert with respect to the refrigerant and absorbent comprising a generator, an absorber, a liquefier and an evaporator connected in circuit, said evaporator comprising means forming an elongated passageway for the inert medium, and means for conveying refrigerant liquid through said passageway in a manner to provide an extended free surface of refrigerant liquid, said last mentioned means being so constructed and arranged that the free surface area of the refrigerant liquid in contact with said inert medium is less than the whole of said free surface area of refrigerant liquid.

24. Absorption refrigerating apparatus of the three-fluid type utilizing a refrigerant, an absorbent and a gaseous medium which is inert with respect to the refrigerant and absorbent comprising a generator, an absorber, a liquefier and an evaporator connected in circuit, said evaporator comprising means forming an elongated passageway for the inert medium and the refrigerant in the liquid state, and means within said conduit for limiting the area of contact between the inert medium and the free surface area of the liquid refrigerant in said passageway to an area which is less than the whole of said free surface area of liquid refrigerant.

25. In a refrigerator, a cabinet structure comprising an insulated food storage chamber and an insulated freezing chamber; an absorption refrigerating apparatus associated with said cabinet structure including an elongated sinuous evaporator element arranged to refrigerate an interior wall of said food storage chamber, an evaporator element arranged to refrigerate said freezing chamber, means providing for circulation of an inert medium through said evaporator element in said freezing chamber and through said elongated evaporator element serially in the order named, means for producing refrigerant liquid and for supplying refrigerant liquid to said elongated evaporator element, and means constructed and arranged to restrict the area of contact between the inert gas and liquid refrigerant flowing through said elongated evaporator element to an amount less than the total free surface area of the refrigerant liquid flowing through said elongated evaporator element to provide a limited refrigerating effect therein along the length of said elongated evaporator element.

GEO. A. BRACE.